April 7, 1964 U. VOGEL 3,127,947
CONTROL DEVICE FOR INDICATING APPARATUS, PARTICULARLY
FOR BALANCES
Filed Feb. 5, 1962 6 Sheets-Sheet 3

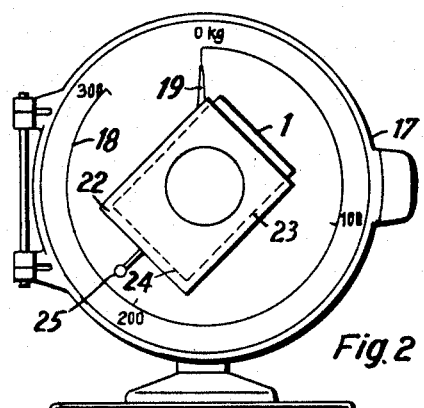
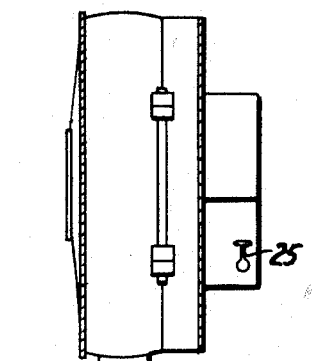
Fig. 2
Fig. 3
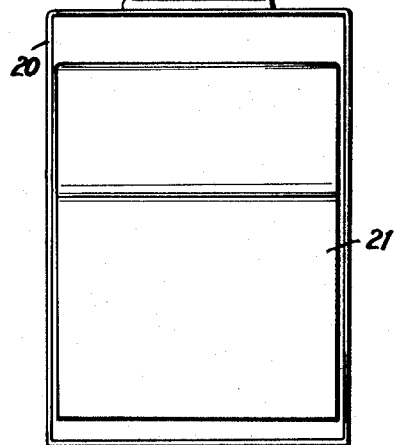
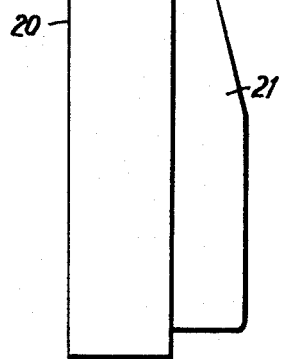
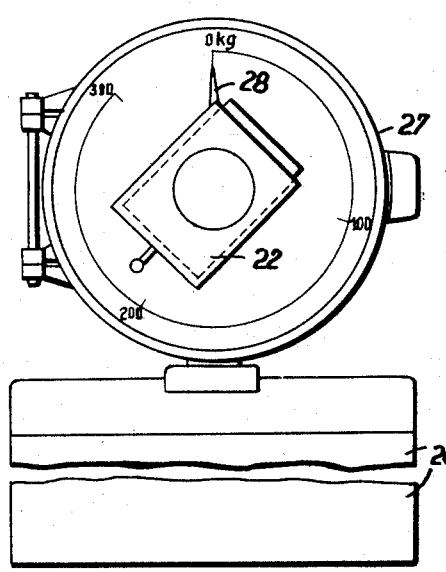
Fig. 4
INVENTOR:
Uwe Vogel,
by Singer, Stern
& Carlberg,
Attorneys.

INVENTOR:
Uwe Vogel,
by Singer, Stern
& Carlberg,
Attorneys.

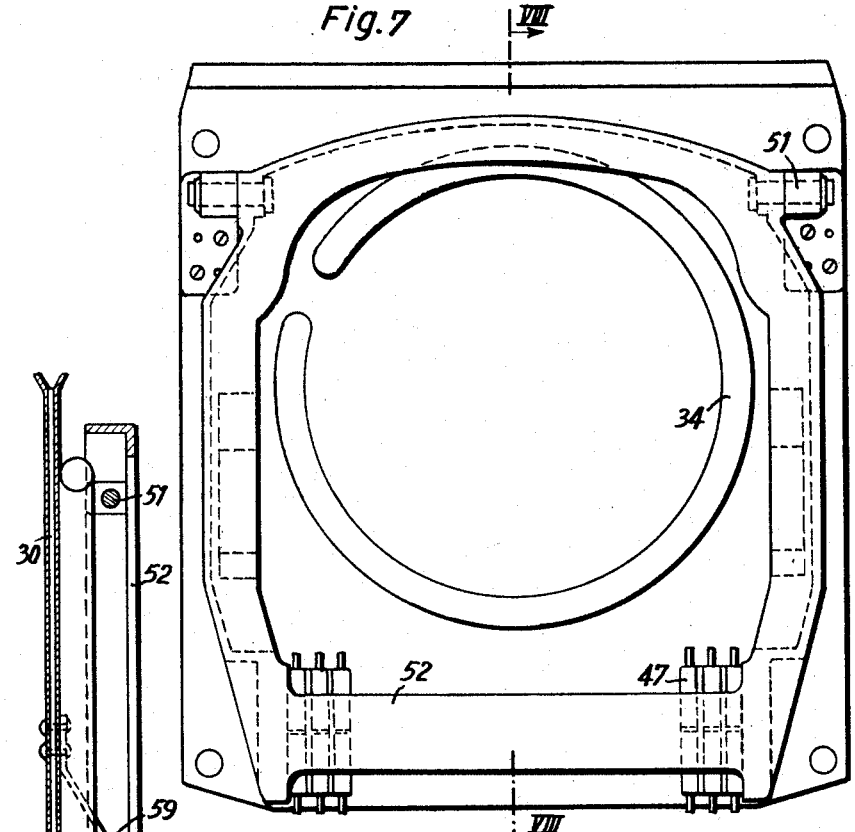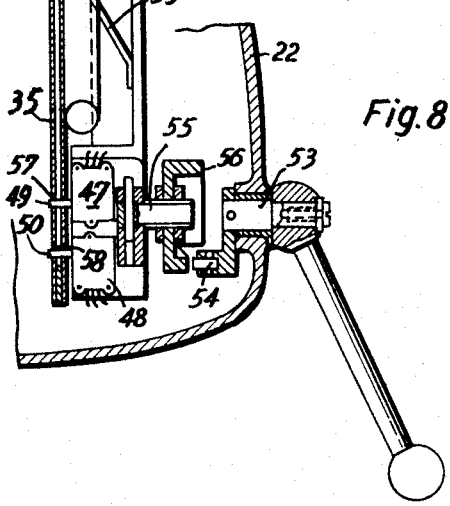

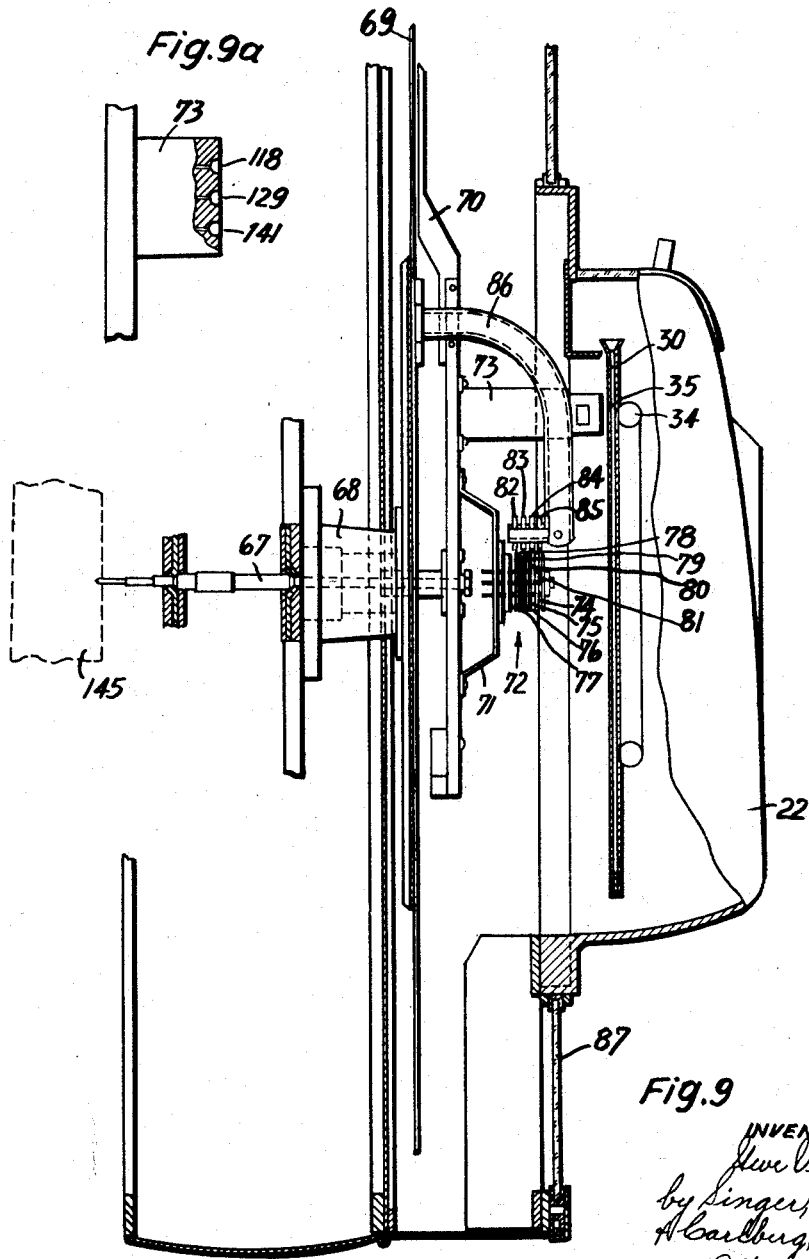

United States Patent Office 3,127,947
Patented Apr. 7, 1964

3,127,947
CONTROL DEVICE FOR INDICATING APPARATUS, PARTICULARLY FOR BALANCES
Uwe Vogel, Hamburg-Wellingsbuttel, Germany, assignor to Vogel & Halke, Hamburg, Germany
Filed Feb. 5, 1962, Ser. No. 171,062
Claims priority, application Germany Feb. 8, 1961
9 Claims. (Cl. 177—70)

The invention relates to a control device for indicating apparatus, particularly for balances with an optical control of the indicated position using a light source.

The preferred application of the invention, to which the following description is directed, relates to balances. The invention is also concerned with other indicating apparatus, however, for example for the measurement of temperature and/or pressure, such as are used for example for programme controlling, particularly for autoclaves. Further applications are possible.

The invention also relates to a punched control card for the control device.

It is known to provide a mirror on the indicator of a balance and to read off the indicator position by reflection of a light beam in this mirror. For this purpose, for example a rotary disc is provided coaxially of the indicator shaft, which carries an optical system for guiding the light beam. This known arrangement operates with several pulse generators and receives a train of scale pulses, which are stored in an adjustable pulse-counting mechanism. The pre-setting of the pulse-counting mechanism can be effected by means of a punched card.

Furthermore, safety arrangements for indicating and pressure devices in balances are known, which give an arrangement of light apertures towards a control disc movable with the indicator. For evaluating the pulses produced, a contact roller arrangement is necessary which has contacts arranged in a corresponding manner.

In self-indicating balances, it is also known to provide a device including a movable scale with a light-permeable portions and one or more photocells, which on alternate similar over or under loading produce an electrical pulse and actuate an indicating or recording apparatus in dependence upon the time intervals between the separate pulses. This construction operates in dependence upon a condenser charging under constant potential.

The invention is based upon the problem of providing a control device for balances which, with the most simple maintenance and relatively simple and cheap construction, controls the course of various components to be weighed in dependence upon the loading of the balance, without producing in this connection a light pulse-like reproduction of the whole scale division. This problem is solved in accordance with the invention by the combination of at least one photodiode on an indicator, an interchangeable punched card with control openings parallel to the path of the photodiode and a series of programme apertures as well as a control arrangement, which responds to pulses from the photodiode and actuates control members for the components to be weighed in accordance with the programme apertures and the control openings.

Instead of the photodiode, another element can be arranged as the light barrier to the indicator. The described provision of the photodiode represents the most preferable solution.

According to an advantageous embodiment, at least two photodiodes are provided on the indicator, wherein one photodiode actuates the control arrangement stepwise in dependence upon the control openings, whereas the other photodiode actuates at the end of the weighing process, in order to disconnect the arrangement. This second photodiode is displaced relative to the first and a control opening in the punched card, which lies in the path between the second photodiode and the indicator, is associated with it.

According to this advantageous embodiment, the invention includes two photodiodes which co-operate with relatively displaced control openings so that one or other control photodiode operates alternately. In this connection, three control diodes altogether are provided, with the one which becomes operative at the end of the weighing process.

The punched control card used for this arrangement has two advantageously directly adjacent and mutually parallel rows of control openings parallel to the path of the indicator in the region of the control photodiode, in which removable control openings are provided, so that the control photodiodes can be operated selectively. At any time, changeover to another component can be provided for or merely an alteration occurs in the supply of the components guided directly on the balance, in such a manner that this supply is finely graduated so that the weighing accuracy is increased.

According to a preferred embodiment, the photodiodes are arranged on an indicator rotating about an axis, advantageously a balance indicator or a corresponding indicator with remote control, and the punched card contains a reproduction of the balance scale with arcuately arranged rows of control openings in which the control openings are pierced. In this embodiment, insofar as the punched card is smaller than the balance scale, which is preferable, the continuous course of the weighing process can be followed by observation of the indicator stroke, as the existing component control can be controlled by means of the punched card at any desired weighing range. In particular, the scale-like arrangement of the control opening row permits ready supervision or examination of the existing punched card, provided this is also provided with weight indications corresponding to the scale values.

The invention also relates to an apparatus with a rectilinear movement of the indicator, in which this indicator can move in a plane or along a curved surface. Correspondingly, the punched control card can have control openings correspondingly provided, as mentioned, along arcuately-arranged control opening strips or also along rectilinear control opening strips.

The programme apertures in the punched card are located for instance in the vicinity of one of its edges and, in the simplest arrangement, is for example a punched border having several rows of holes.

The control arrangement on the balance has a cassette, for receiving the punched card, directly in front of the indicator of the balance and in such an arrangement that the scale on the punched card is provided concentrically to the balance indicator. This cassette also contains the light source, which in the preferred embodiment is a circular soffit or tubular lamp, as well as a ventilator for cooling the arrangement. The cassette is preferably smaller than the balance scale and, with a polygonal construction of the punched card, is so arranged that the punched card falls under its own weight with two edges on abutment strips. With a rectangular punched card, the arrangement is made in such a way that a diagonal of the punched card lies substantially perpendicular.

The cassette is advantageously closed at the front in order to avoid undesired visibility of the group of components on the punched card. The invention also provides for an inspection slot or such a construction of the punched card in relation to the covered part of the cassette that a definite section or an edge of the punched card is visible, so that for example with predetermined colouring of this section or edge or by a reference character, control of the inserted punched card is possible.

The invention is also directed to a balance provided with a control device according to the invention, as well as to a punched card usable in the control device according to the invention.

Further advantages and features of the invention will appear from the following description of an embodiment shown in the accompanying drawings. In the drawings:

FIG. 2 shows a front view of a balance according to the invention;

FIG. 3 shows a side view of the balance;

FIG. 4 shows a front view of an apparatus for punched card remote control;

FIG. 7 shows a front view of the cassette seen in the plane VII—VII of FIG. 5, for simultaneous representation of the sensing bridge;

FIG. 8 shows a section along the line VIII—VIII in FIG. 7 with the additional representation of the manual actuating lever for the sensing bridge;

FIG. 9 shows a side view in section for illustrating the indicator unit of the balance in association with the cassette;

FIG. 9a shows a partial side view of FIG. 9 on another scale, for explaining the arrangement of the photo-diodes;

Figure 1:
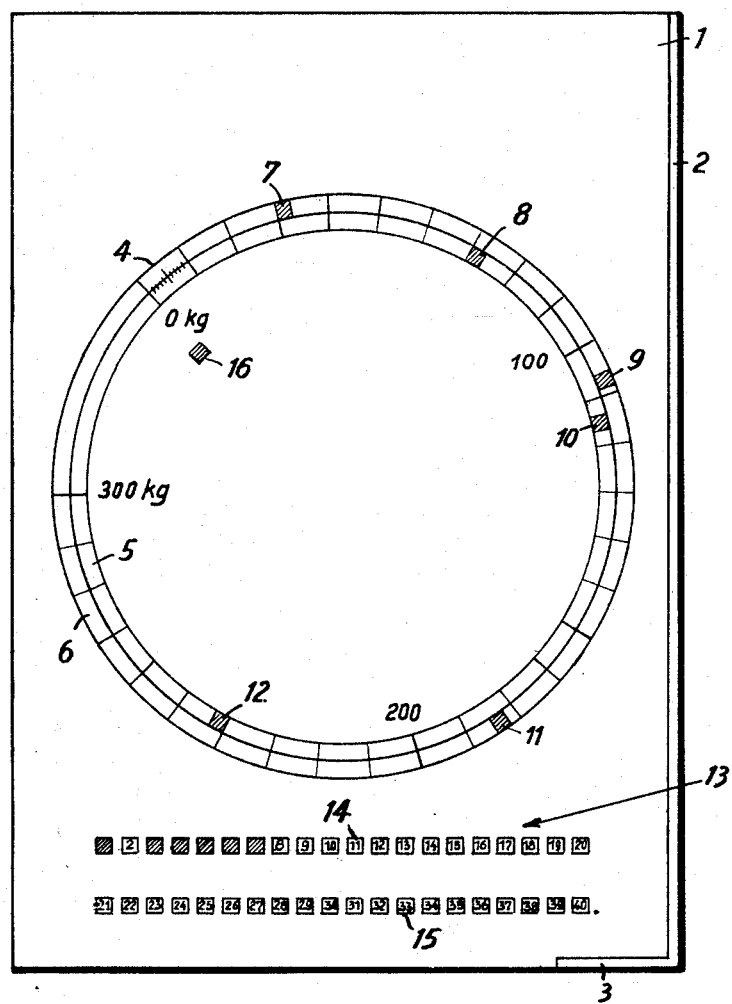
FIG. 1 shows a front view of a preferred embodiment of the punched card of the invention.

The punched card shown in FIG. 1 is indicated at 1. It is for example a rectangular card, having the DIN A4 format (a standardized German stationery size equalling approximately 8.3"x 11.7"). Two edges 2 and 3 are specially marked and can, if desired, be strengthened or can be provided with supporting strips, which give these edge regions a greater weight. The punched card 1 has a circular weight scale 4 in its middle region, which corresponds essentially to the subdivisions which occur on the balance in which the punched card is to be used. The present example shows a sub-division from 0 to 300 kg.

For reasons which are explained below, the beginning of the scale with the value 0 kg. is preferably not arranged on the middle line of the card, but is displaced angularly.

In the region of the circular weight scale 4, two regions for control apertures 5, 6 are arranged parallel to one another and concentrically. These control aperture regions are covered by a part of the weight scale 4, so that in any position of the control aperture regions, the weight corresponding to this position can be read off.

In the control aperture regions 5, 6, control apertures 7, 8, 9, 10, 11 and 12 are so arranged that each successive control aperture is provided in a different control aperture region. These control apertures are preferably square. It is also possible to arrange the edges of the control apertures so that they lie radially to the control aperture regions, so that the inner edges of the control apertures are somewhat more curved than the outer edges. In this way, a somewhat closer succession of control apertures can be provided. The least distance depends upon the size of the scale and the diameter of the arcuate control aperture regions, as well as on the size of the aperture themselves, in which the latter should not exceed a minimum value for carrying out reliable functioning.

It is important for the control apertures that the side edges are constructed as reference edges for the operations to be carried out. In the embodiment shown, as seen from the middle of the scale outwardly, this is the left-hand edge or the edge which lies at the zero point end of the scale. This choice of the reference edge is a question of definition and depends ultimately on the arrangement of the control circuit or control arrangement used.

The interchangeable arrangement has the purpose of increasing the reliability, if indicator fluctuations occur, since after carrying out a switching function by the passage of a control photodiode to the reference edge of its control aperture, a change-over to the other control photodiode occurs. By this fluctuations of the first photodiode no longer have any influence at the reference edge of a control aperture, after the control process has been completed once. This feature enables an extremely rapid inspection of the components to be made. Furthermore, by the use of two control photodiodes, the least switching distance is smaller. This is of considerable importance for components with very small dimensions.

In the punched control card, a row of spaces 13 is provided which consists of two series 14, 15 with markings for the apertures concerned. Each series has for example 20 marked spaces, which can be punched out in order to form programme apertures. For example, in a simple embodiment, each aperture is associated with a definite component. It is conceivable that a weighing with forty components is possible. In the embodiment shown, the spaces 1, 3, 4, 5, 6, and 7, are punched out in the series 14, which indicates that of the 40 components available for weighing only the components 1, 3, 4, 5, 6 and 7 are employed. With reference to this choice of components, the embodiment illustrated gives the following for the control aperture series:

Component 1—weight 30.0 kg.—punched at 30.0 kg.
Component 3—weight 40.0 kg.—punched at 70.0 kg.
Component 4—weight 38.0 kg.—punched at 108.0 kg.
Component 5—weight 4.5 kg.—punched at 112.5 kg.
Component 6—weight 69.5 kg.—punched at 182.0 kg.
Component 7—weight 68.0 kg.—punched at 240.0 kg.

The example shows a simple embodiment, in which an equal supply of components are made use of in operation.

Within the scope of the invention, there is also the possibility of associating, for example, two adjacent spaces of the punch hole row 13 with the same component and in one aperture using the second space of one component on passage of a control photodiode to one control aperture to effect throttling of the component supply, whereby the accuracy of the weighing is improved. The use of this embodiment of the invention depends upon existing requirements, speeds and the provision of the components.

In the region of the control apertures or within the control aperture row, a further aperture 16 is provided which is associated with the zero point of the scale. This control aperture co-operates with a separate photodiode and represents the starting position of the switching process on completion of the weighing process, when the indicator of the balance is returned to its zero point. The further aperture 16 can be displaced relative to the control apertures, by being arranged outside the control aperture row, or it can also be provided in a control aperture row, wherein the photodiode associated with this aperture 16 is displaced with respect to the control photodiodes. In the first case, the special photodiode lies at a distance from an extension of the line connecting the control photodiodes and, in the second case, the separate photodiode lies for example at a distance from one of the control photodiodes opposite to the direction of movement of the indicator.

Figure 11:
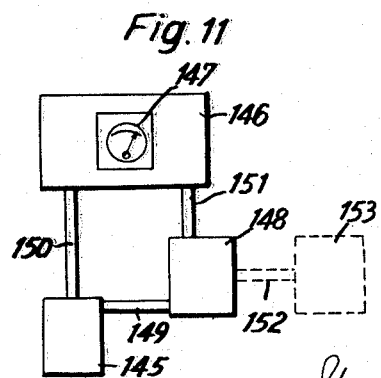
FIG. 11 shows a diagrammatic arrangement for an embodiment of the control device according to the invention, illustrating the arrangement of the various constructional units.
Figure 10:
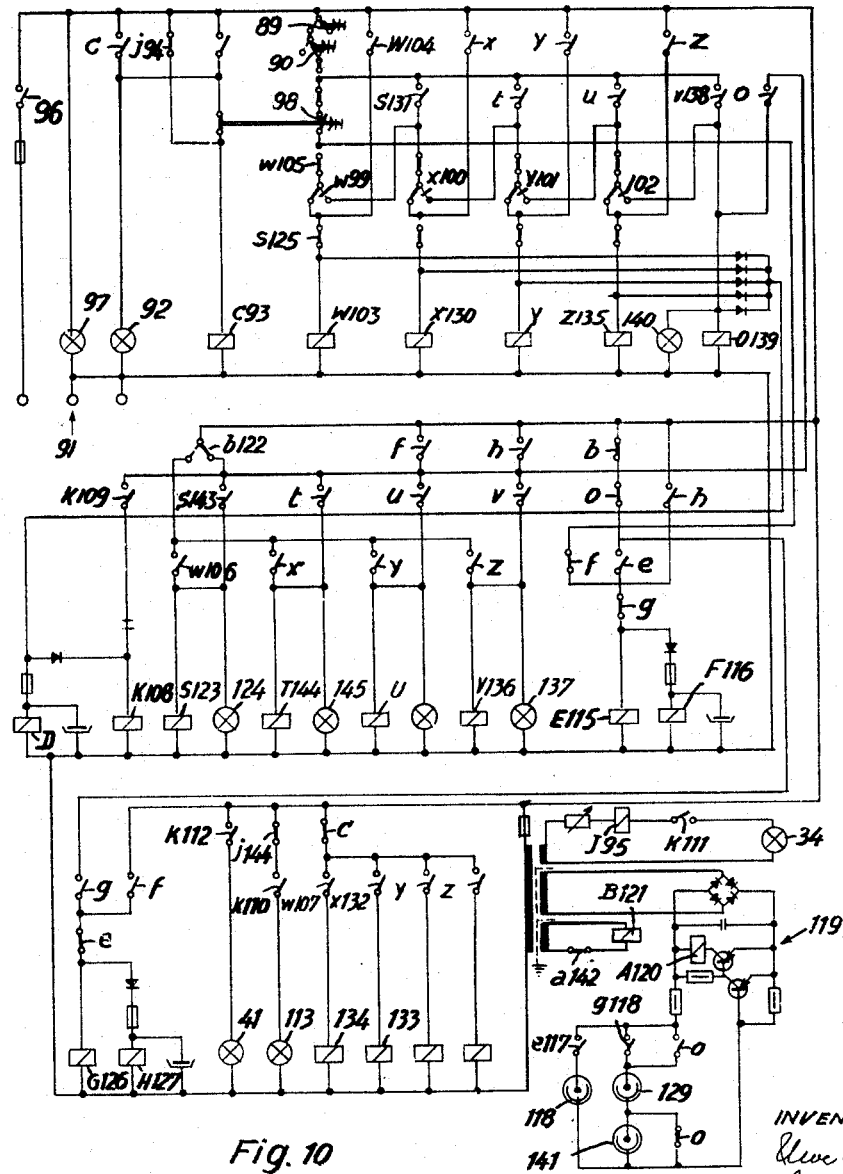
FIG. 10 shows a circuit diagram for the control device according to the invention, for explaining the function thereof.

In FIG. 11, a diagrammatic arrangement of the units is shown. 145 is the measuring mechanism, for example, a weighing device or a temperature senser, a pressure meter or the like. 146 is an indicator device with a scale 147, which in the arrangement according to the invention is associated with photodiodes as well as the punched card described. 148 is a control arrangement, for example, with the multiplicity of parts according to FIG. 10, and, if required, with control members, for example, for the measuring mechanism 145 or a weighing device. These control members can be associated in the constructional unit indicated at 145, in which actuating connections 149 are provided between the units 145 and 148.

Actuating members for the control elements are, for example, actuating magnets 134, 133 . . . (FIG. 10), the control elements can also be provided as discs, valves, flaps or the like in a constructional unit 153.

It can be seen that the quantities measured by the measuring mechanism 145 are transmitted by a functional connection 150 to the indicating device 146 with the indicator unit and the punched card. The pulses delivered by the photodiodes to the indicator are supplied via the functional connection 151 to the control arrangement 148, where they then either actuate the measuring mechanism by way of the functional connection 149 or, by way of a functional connection 152 shown dotted in FIG. 11, the control elements at 153, which can provide any desired programme control.

In FIG. 2, a housing 17 is shown, in which the balance scale 18 is arranged and is forwardly visible and in which the indicator 19 is mounted, supported upon a casing 20. This casing can be the usual mounting for the scale housing 17. In the arrangement according to the invention, this casing is enlarged by means of a control unit 21, which receives the circuit arrangement with the circuits shown in FIG. 10 for the control arrangement. In front of the scale disc and the indicator 19, for example, in front of the window in the scale housing 17, a cassette 22 is provided for receiving the punched card 1. This cassette is so arranged that the centre of the control aperture row indicated at 5 and 6 in FIG. 1 lies coaxial to the scale indicator 19. The cassette 22 is otherwise parallel to the plane of the scale disc and arranged at an inclination so that the card 1 is inserted with an inclination from the upper right portion. In this way, the card lies, under the influence of its own weight, with its edges 2, 3 on the stops or abutment strips in the cassette. These abutment strips are indicated at 23 and 24. By this means, an exact positioning is automatically achieved. This arrangement would not be present, if the cassette 22 were arranged perpendicularly. The arrangement is feasible, in the manner already described, in that the edges 2, 3 are specially profiled or strengthened. A particular feature lies for example in the use of a metallic stiffening of magnetisable material and the provision of permanent magnets in the region of the abutment strips 23, 24 in the cassette.

The cassette is closable at the upper right portion with a cover (not shown) of a transparent material. This can be a snap-on lid of Plexiglas for example, which allows observation of the edge of the punched card. The arrangement of the cover is essential, in order to prevent the ingress of dust or other foreign material which could prevent the exact location or introduction of the punched card.

A hand lever 25 projects from the cassette. This serves to actuate a sensing bridge for sensing the programme apertures in the punched card in the cassette. In connection with the sensing bridge or independently of it, an observation aperture is desirably made in the edge of the punched card, which is sensed by a feeler finger, wherein the other control arrangement remains locked until correct insertion of the punched card is signalled by the feeler finger passing through the checking aperture. The feeler is also associated with a further feeler finger, which is actuated by the inserted punched card in an unapertured position and which must be pressed down if the arrangement is to be rendered operative. This second feeler finger is a safety measure, since the first-mentioned finger is located in its operative operative position, even if no punched card has been inserted.

FIG. 4 serves to illustrate how the apparatus according to the invention is used with a known balance remote control. This remote control includes a casing 26, on which a scale housing 27 is arranged, which corresponds essentially to the scale housing 17. The indicator 28 provided in the scale housing is driven synchronously to a balance indicator 19 by way of a remote control, for example an electric shaft, and in the same way as described above for the balance indicator 19, can co-operate with a punched card. For this purpose, a cassette 22 having the construction already described is provided on the window of the scale housing 27.

Figure 6:
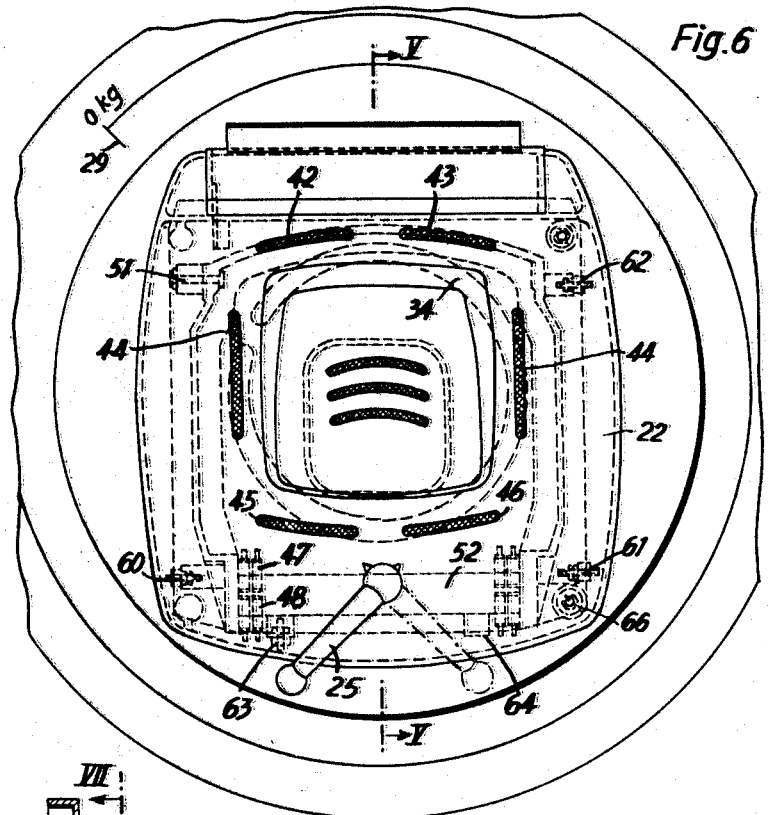
FIG. 6 shows a front view of a balance according to the invention partly broken away, wherein the inner parts are indicated in dotted lines.
Figure 5:
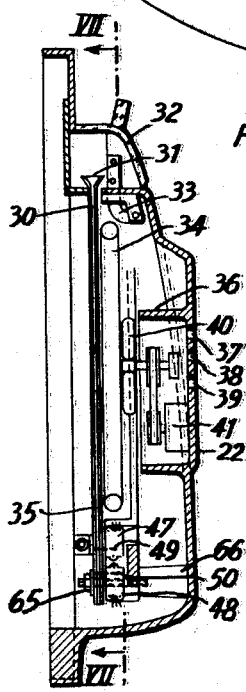
FIG. 5 shows a diagrammatic partial side view of a cassette unit, substantially on the line V—V of FIG. 6, which cassette serves for receiving the punched card.

In FIGS. 5 to 9, an embodiment of the invention is described in detail. FIGS. 5 and 6 show the cassette 22, in which FIG. 6 shows how the zero position 29 on the balance scale lies substantially along a diagonal of the cassette 22. In the cassette, which can be closed forwardly by means of a cover, a receiver 30 for the punched card is provided. The upper opening 31 of the receiver is widened out in funnel fashion, in order to facilitate insertion of the punched card. This end of the receiver is covered by a transparent cover 32 which, by means of an angular hinge part 33, is held under its own weight in the closed position.

The balance scale and the indicator system are located, as shown in FIG. 5, to the left of the cassette, as can also be seen in FIG. 9. Closely adjacent the container 30, an annular lamp 34 is mounted by means of clips and its diameter corresponds to the row of control apertures. As shown in FIG. 6, the connections to the lamp 34 lie in the scale-free region of the balance scale. The container 30 is provided in the region of the lamp 34 or the control aperture rows 5, 6 with a slot 35, through which the light from the light source, i.e. the lamp 34, can pass through the container 30, constituted by sheet metal, for example, and the control aperture in the punched card. The slot extends over a section of a circle, which is interrupted only in the region of the scale-free section of the balance scale.

At the forward wall of the cassette and substantially concentric to the arrangement, a section 36 of the wall extends inwardly in the direction towards the receiver 30. The surface in the front of the cassette delimited by this wall section 36 includes ventilating slots 37, 38 and 39. In the space defined by the wall section 36, a ventilator fan 40 with a driving motor 41 is provided. This fan serves to cool the lamp 34 and to draw in air through the slots 37 to 39. By the channel-shaped construction of the wall part 36, a uniform cooling air supply is ensured. The cooling air stream is distributed in the container 30 and flows radially outwardly. To extract the cooling air, air extraction slots 42, 43, 44, 44', 45 and 46 are arranged substantially concentrically outside the wall section 36. The arrangement of an effective cooling is thus essentially ensured, since a simple construction with a generally circular light source is thus provided which allows the whole region of operation of the photodiodes to be used according to the indicator stroke in the scale range. The loading of the indicator system with a light source and the like is avoided and also by the uniform illumination of the punched card serving as a screen the conditions for any arrangement of the control apertures are provided.

As shown in FIG. 5, in the lower region of the cassette two rows of switches 47, 48 with sensing pins 49, 50 are provided. These switches or their pins serve to sense the programme apertures in the aperture row 13. For this purpose, the container 30 includes apertures or rows of apertures in the region of the sensing pins, so that the sensing pins can project into the container 30 either (1) if no punched card is present in the container, or,
(2) if a sensing pin locates a programme aperture.

The rows of switches 47, 48, which in general are illustrated in FIGS. 7 and 8, are located on a sensing bridge 52 pivotable about two bearing pins 51. This bridge is urged by means of a hand lever 25 into its functional position or is lifted from it. The hand lever is secured on a rotary pin 53, which is located in the forward wall of the cassette 22 (FIGS. 6 and 8) and carries a crank pin 54 with a roller on the inside of the cassette. On the sensing bridge, by means of a bolt 55 secured in a manner not described in detail, a cam surface 56 associated with the roller on the crank pin is arranged which, in accordance with the position of the crank pin 54 or the hand lever 25, presses the sensing bridge 52 into its operative position, as shown for example in FIG. 8, in which position the sensing pins 49, 50 project through their associated openings 57, 58 into the container 30. In one position of the crank lever 25, for example, in the position shown dotted in FIG. 6 and indicated by "out," the sensing bridge 52 is pivoted counterclockwise by a compression spring 59 secured between it and the container 30, for instance, whereby the sensing pins 49, 50 are withdrawn from the openings 57, 58 and a punched card can be freely inserted. The sensing bridge 52 with its sides is indicated in dotted lines in FIG. 6. Also it will be seen from FIGS. 5 and 6 that adjusting screws 60, 61, 62, 63 and 64 are provided, a further adjusting screw not being shown as it would otherwise cover up the position of the sensing bridge 52 in FIG. 6. The adjusting arrangement serves for adjusting the unit comprising the container 30 and the lamp 34 as well as the sensing bridge 52 in relation to the balance scale or in relation to the axis of the indicating system, so that an exact registration can be provided between the photodiodes provided thereon and the arcuate slot 35. For example, one or more fixing screws 65 are provided, by means of which the preferred end position of the cassette 22 can be determined, for example, on four projections 66 on the cassette. Such an adjustment of the constructional unit mentioned is important, since it enables relatively large adjustments of the cassette to be made without having accurate tolerances.

In FIG. 9, the arrangement of the cassette 22 or the container 30 with the lamp 34 is shown in relation to the indicator system of the balance. The indicator shaft 67, which is connected with a diagrammatically-indicated measuring mechanism 145, for example, a weighing device, is rotatably mounted on a hub 64 rigidly arranged in the scale housing. The scale 69 is likewise secured to this hub. The indicator 70 pivots at its front on a bail-like projection 71 of a connection unit 72 for the current supply to the separate photodiodes. These are secured on a hub projection 73, which projects from the indicator toward the container 30 and terminates in the vicinity of the arcuate slot 35. From this projection 73, electrical connections lead to the adjacent contact parts 74, 75, 76 and 77, which are separated from one another by radial partition walls. The contact parts, which are connected for example to pins for the current supply, are affixed to conductive spiral springs 78, 79, 80 and 81, which surround the contact parts in several coils somewhat like the balance mechanism of a clock, and are secured by their outer ends to terminals 82, 83, 84 and 85. These terminal contacts are located on a mounting member 86, which is guided in the region of the scale-free section of the balance scale so as to be associated with the balance. The member 86 thus passes through a region through which the balance indicator 70 does not move.

The connection provided is of especial importance, since friction-generating and therefore wearable elements, such as brushes, are avoided which at the same time would impart a negatively-operative frictional moment to the indicator stroke.

It can be seen from FIG. 9 that the cassette 22 is provided in the middle region of the disc 87 of the balance. The measurements of the cassette are such that the indicator tip is visible outside the cassette through the disc 87, so that the weighing movement can be followed on the indicator stroke.

It can also be seen from FIG. 9 that, by means of clips (not indicated), the arrangement of the disc 87 and the cassette 22 can be removed from the indicator and scale unit, whereby the adjusting means in the cassette become accessible.

In relation to the circuit diagram according to FIG. 10, the operation of the arrangement is described below.

After a punched card has been inserted and the sensing bridge has been moved into its operative position by means of the hand lever 25, the punched card control becomes effective which has two sensing fingers 89, 90 in the manner described. The control switch is only connected to the mains supply connector 91 if one of the switches with the sensing finger 89 is actuated by the punched card and the sensing finger 90 for the other switch can project through a control aperture in the card. The control circuit is then energised. If the punched card were inserted upside down, for example, the sensing finger 90 would energise the associated switch, so that the circuit through the two switches would be interrupted. The stop lamp 92 would then be illuminated, since the relay C93 would first pass the potential over the closed rest contact $j94$ of the relay J95. It may be mentioned that, on throwing the main switch 96, the circuit control lamp 97 becomes illuminated.

If the punched card control actuated by the sensing fingers 89, 90 closes the circuit, the starting key 98 can be depressed.

For simplicity, the circuit diagram only shows a weighing device with four components. It will be seen that any multiplication, for example up to forty components, can follow the same sequence, as will be clear from FIG. 1.

A sensing finger (49, 50) for actuating a switch in the series 47, 48 is associated with a programme aperture. The four switches are shown in FIG. 10, at 99, 100, 101 and 102. Furthermore, in the embodiment described, all the switches 99 to 102 are shown in a position which corresponds to the presence of a programme aperture, so that all four components are weighed out.

After depressing the starting key, a circuit is established through the switch 99 to energise the relay W103. If the switch 99 were in the dotted line position, if no programme aperture were present, the circuit would be shunted via the switch 99 through the connection shown to the switch 100. It can be seen that in this way a test can only be carried out with the first selected component. For example, with forty components, the 15th or 28th component would be selected.

Since according to the example for the switch 99, a programme aperture is present, the weighing process begins with the first component, with which the switch 99 is associated. The relay W103 is thus energised. This switches all the contacts associated with it, that is the contacts $w104$, $w105$, $w106$ and $w107$.

Via the contact of the switch 99 or the self-holding contact $w104$ for the relay W103, the relay K108 is energised which actuates all its contacts $k109$, $k110$, $k111$ and $k112$. The contact $k112$ switches on the motor 41 for cooling the lamp 34, whereas the contact $k111$ energises the lamp 34 and thus also energises the relay J95. The circuit is thus also opened for a signal lamp 113, in which the rest contact $j144$ lies, so that this signal lamp is then only illuminated if the current is interrupted through the lamp 34. Simultaneously with the energisation of J95, $j94$ opens, whereby the relay C93 is de-energised and the stop lamp 92 is extinguished. After pressing the starting key 98, the relay E115 is likewise actuated and simultaneously, with a delay, the relay F116. On pressing the starting key 98, the relay A120 is also energised. This opens the operating contact $a142$, so that the relay B121 can no longer operate.

By means of the relay contact $e117$, the photodiode 118 for effecting the first component is brought into operative position. After the recorded weight of the first component has been attained, by energisation of the photodiode 118, through the transistor amplifier shown in series with 119, a pulse is supplied to the rest position of the relay A120. Then the contact a142 again closes and hence the relay B121 is actuated. The relay S123 and the associated signal lamp 124 are made operative via the contacts b121 and w106, so that the first component is fully satisfied. Simultaneously, by actuation of the contact s125, the relay W103 as well as the relay E115 open. The relay B121 is disconnected from the excitation potential on extinguishing of the pulse from the photodiode 118, so that the switch b122 is returned to its starting position. The signal lamp 124 remains illuminated, after operation of the relay B121 via the contact s143 and one of the relays F or H, and the signal lamp 124 remains illuminated until the whole weighing process has been completed and the circuit has been returned to its initial condition.

An actuating member for the supply of the first component, for example, an actuating magnet 134 has already been suitably energised via the contact w107.

The relay F116 operates with delay. The delayed actuation is so arranged that, in the interrupted time interval, the relay G126 and then the relay H127 can be operated. It can be seen that, by actuation of the contact g128, the second photodiode 129 is energised. Further, the relay X130 is energised via the contact s131 for the start of the second component weighing step, since the selector switch 100 has located a programme aperture in the position shown. Then the automatic weighing of the second component begins, since an actuating member, for example an actuating magnet 133 for this component, has been disconnected via the contact x132, which had previously disconnected a corresponding actuating member 134 through the contact W107. The process repeats exactly as for the first component except that the diodes now operate in the reverse arrangement, that is, on completion of the weighing of the second component, by control of the relays G126 and H127 on the one hand and E115 and F116 on the other hand, the photodiode 118 is energised. On the next switching pulse to the relay A120, the relay B121 receives a further switching pulse via a142, whereby the relay T144 and the associated signal lamp 145 are energised as previously described for the relay S123 and the signal lamp 124.

If now the last component has been carried out, the relay Z135 opens and the relay V136 is energised, whereby simultaneously the lamp 137 is illuminated to indicate that the weighing process for the four components has been completed. The relay O139 is energised via the contact V138 and, simultaneously, the lamp 140 is illuminated to indicate "programme completed." Furthermore, the diodes 129 and 141 are connected together. If after emptying the balance container, the balance indicator has returned to the zero position, the diodes 129 and 141 operate the relay A120 and hence the relay B121 via the transistor amplifier 119. The relay B121 operates via the contact B122 to deenergise all the other actuated relays, since previously the relays F and H had been deenergised. The apparatus is thus in the starting position again for actuation of the start key 98 as above described.

In the preceding description, for the purpose of clarity, the contacts to be mentioned in the description of the function have been described. The various courses can be readily seen from the circuit diagram according to the abovedescribed functional operation, so that a complete representation of this appears to be unnecessary.

I claim:
1. In control means for supplying more than two batches of material to a weighing scale, an indicator scale, an indicator movable over said indicator scale in dependence upon the load on the weighing scale, at least two photodiodes secured to said indicator in positions which are offset to one another in a direction perpendicular to the path of movement of said indicator, a source of light adapted to illuminate a band-shaped field corresponding to the paths of movement of said photodiodes, a housing enclosing said indicator, indicator scale and source of light, means for holding a hole card between said indicator and source of light, said hole card having a first group of holes and a second group of holes, said first group of holes including two rows of holes arranged along said band-shaped field of illumination each for coaction with one of said photodiodes in such a manner that in the movement of the indicator said photodiodes alternatingly pass the holes in their respective rows, a control device, first connecting circuit means between said photodiodes and control device for progressively actuating said control device in dependence upon impulses from said photodiodes, a plurality of control means in said control device for controlling the supply of the respective batches, second connecting circuit means between the control device and said control means for actuation of the individual control means successively corresponding to the impulses delivered by the photodiodes, a program selector device with a switch for each of said plurality of control means, actuating elements in said selector device disposed adjacent to said hole card and each registering with a hole in said second group of holes to actuate said selector device in dependence upon the presence and absence of a program hole at the respective actuating element, third connecting circuit means between said selector device and the control device for conditioning said plurality of control means in dependence upon the operation of said actuating elements and for bridging any of said control means where no actuating element has been operated, and relay switching means in said control device for operation in dependence upon alternating impulses from said photodiodes to cause control steps including connecting a selected control means and disconnecting said control means.

2. Control means as set forth in claim 1, including a shaft, means rotatably supporting said shaft in said housing, means connecting said shaft with said indicator, and means connecting said shaft with the weighing scale for rotation thereby, said first group of holes in the hole card being arcuately arranged.

3. Control means as set forth in claim 1, including a third photodiode on said indicator spaced from said first-mentioned diodes and registering with an aperture in said hole card between the ends of said rows of holes, and a switch in said control device connected with said third photodiode to deenergize said control device.

4. Control means as set forth in claim 1, in which said second group of holes in the hole card is arranged in the form of a plurality of rows of holes parallel with an edge of said hole card, and said actuating elements in the selector device are arranged accordingly.

5. Control means as set forth in claim 1, including a shaft rotatably mounted in said housing, means connecting said shaft with said weighing scale, means connecting said shaft with said indicator, said means for holding the hole card being so arranged in the housing as to hold the hole card in a position in which said first group of holes is concentric with said axis, and a slot in said holding means concentric with said shaft and registering with said first group of holes, said photodiodes and said source of light.

6. Control means as set forth in claim 5, in which said card holding means comprises a parallelepipedic container mounted with one corner thereof at a lower level than the remainder of the container so as to support the hole card along two adjacent edges thereof.

7. In a control means for supplying more than two batches of material to a weighing scale, an indicator scale, an indicator movable over said indicator scale in dependence upon the load on the weighing scale, at least two photodiodes secured to said indicator in positions which are offset to one another in a direction perpendicular to the path of movement of said indicator, a source of light adapted to illuminate a band-shaped field corresponding to the paths of movement of said photodiodes, a housing enclosing said indicator, indicator scale and source of light, means for holding a hole card between said indicator and source of light, said hole card having a first group of holes and a second group of holes, said first group of holes including two rows of holes arranged along said band-shaped field of illumination each for coaction with one of said photodiodes in such a manner that in the movement of the indicator said photodiodes alternatingly pass the holes in their respective rows, a control device, first connecting circuit means between said photodiodes and control device for progressively actuating said control device in dependence upon impulses from said photodiodes, a plurality of control means in said control device for controlling the supply of the respective batches, second connecting circuit means between the control device and said control means for actuation of the individual control means successively corresponding to the impulses delivered by the photodiodes, a program selector device with a switch for each of said plurality of control means, actuating elements in said selector device disposed adjacent to said hole card and each registering with a hole in said second group of holes to actuate said selector device in dependence upon the presence and absence of a program hole at the respective actuating element, third connecting circuit means between said selector device and the control device for conditioning said plurality of control means in dependence upon the operation of said actuating elements and for bridging any of said control means where no actuating element has been operated, and relay switching means in said control device for operation in dependence upon alternating impulses from said photodiodes to cause control steps including connecting a selected control means and disconnecting said control means, a shaft rotatably mounted in said housing, means connecting said shaft with said weighing scale, means connecting said shaft with said indicator, said means for holding the hole card being so arranged in the housing as to hold the hole card in a position in which said first group of holes is concentric with said axis, and a slot in said holding means concentric with said shaft and registering with said first group of holes, said photodiodes and said source of light, said card holding means comprising a parallelepipedic container mounted with one corner thereof at a lower level than the remainder of the container so as to support the hole card along two adjacent edges thereof, one of said adjacent edges of the hole card being provided with a strip of magnetizable material, and a magnet in said container at said one edge of the hole card.

8. Control means as set forth in claim 7, including a sensing bridge in the housing, said sensing bridge carrying the selector device, means for movably mounting said sensing bridge, a hand lever pivotally mounted in the housing and adapted to actuate said sensing bridge to move said selector device to and from its operational position, apertures in said hole card holder through which said actuating elements of the selector device extend when said bridge is in operative position.

9. Control means as set forth in claim 8, including two switches in the control device provided in the supply circuit thereof in such a manner that operation of said switches conditions said control device for operation, and two sensing fingers in said bridge operatively connected with said switches and actuatable by said hole card.

References Cited in the file of this patent

UNITED STATES PATENTS

| | | |
|---|---|---|
| 1,746,562 | Sounitza | Feb. 11, 1930 |
| 1,815,996 | Weaver | July 28, 1931 |
| 1,931,862 | Reichel | Oct. 24, 1933 |
| 1,987,322 | Campbell | Jan. 8, 1935 |
| 2,067,613 | McMaster | Jan. 12, 1937 |
| 2,524,338 | Ylinen | Oct. 3, 1950 |
| 2,625,300 | Saxe | Jan. 13, 1953 |
| 2,625,301 | Saxe | Jan. 13, 1953 |
| 2,650,790 | Carliss | Sept. 1, 1953 |
| 2,659,563 | Saxe | Nov. 17, 1953 |
| 2,982,368 | McMahon | May 2, 1961 |

FOREIGN PATENTS

| | | |
|---|---|---|
| 1,204,293 | France | Jan. 25, 1960 |